(12) United States Patent
Sera (10) Patent No.: US 8,789,876 B2
(45) Date of Patent: Jul. 29, 2014

(54) STRUCTURE FOR VEHICLE BODY REAR PORTION (75) Inventor: Takashi Sera, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/821,664

(22) PCT Filed: Aug. 3, 2011

(86) PCT No.: PCT/JP2011/067754
§ 371 (c)(1),
(2), (4) Date: Mar. 8, 2013

(87) PCT Pub. No.: WO2012/032884
PCT Pub. Date: Mar. 15, 2012

(65) Prior Publication Data
US 2013/0169006 A1 Jul. 4, 2013

(30) Foreign Application Priority Data
Sep. 9, 2010 (JP) ................. 2010-202390

(51) Int. Cl.
B60N 99/00 (2006.01)
B62D 25/08 (2006.01)
B62D 25/16 (2006.01)
(52) U.S. Cl.
CPC .............. B62D 25/08 (2013.01); B62D 25/088 (2013.01); B62D 25/16 (2013.01); B62D 25/087 (2013.01)
USPC .................................. 296/193.08

(58) Field of Classification Search
USPC ................. 296/193.08, 198, 203.04
See application file for complete search history.

(56) References Cited

U.S. PATENT DOCUMENTS

2004/0245807 A1* 12/2004 Yakata et al. ............ 296/203.04
2007/0138837 A1* 6/2007 Tomioka .................. 296/203.04
2008/0007093 A1* 1/2008 Andou et al. ............. 296/193.08
2010/0133879 A1* 6/2010 Leonetti et al. .......... 296/193.08

FOREIGN PATENT DOCUMENTS

| JP | H03-15788 | 2/1991 |
|----|-----------|--------|
| JP | H03-52289 | 5/1991 |
| JP | 11-198863 | 7/1999 |
| JP | 2000-168613 | 6/2000 |
| JP | 2006-312376 | 11/2006 |
| JP | 2007-296890 | 11/2007 |
| JP | 2008-018750 | 1/2008 |
| JP | 2010-167872 | 8/2010 |

* cited by examiner

Primary Examiner — Lori Lyjak
(74) Attorney, Agent, or Firm — Rankin, Hill & Clark LLP (57) ABSTRACT A structure for a vehicle body rear portion has a rear pillar (21), a rear wheel arch (15), a damper stiffener (22) which is connected so that the load of the damper (18) transmitted through the rear wheel arch (15) is dispersed to the rear pillar (21), and a brace (23) which is connected from the rear wheel arch (15) to the rear pillar (21). The brace (23) has a front surface section (31) which faces forward, a side surface section (32), and a rear surface section (33) which faces the front surface section (31). A front ridge line section (35) and/or a rear ridge line section (36) reaches the rear pillar (21) from the rear wheel arch (15).

7 Claims, 7 Drawing Sheets

STRUCTURE FOR VEHICLE BODY REAR PORTION

TECHNICAL FIELD

The present invention relates to a rear vehicle body structure where a damper stiffener and a brace are disposed between a rear wheel arch supporting a rear suspension damper and a rear pillar provided above the rear wheel arch.

BACKGROUND ART

Heretofore, there has been known a rear vehicle body structure where a rear wheel arch (rear wheel house) has a closed sectional shape defined in its portion from a floor located therebelow to a rear pillar located thereabove (see, for example, patent literature 1 identified below).

More specifically, in the known rear vehicle body structure, a first closed sectional shape is defined with a channel-shaped gusset attached to the outer surface of the rear wheel arch, and a second closed sectional shape is defined with a channel-shaped damper stiffener attached to the upper surface of the rear wheel arch in such a manner to extend from the upper surface of the rear wheel arch to the rear pillar continuously with the first closed sectional shape. Thus, it is possible to increase the mechanical strength of a rear vehicle body section without decreasing the interior space of a vehicle compartment.

If, in the rear vehicle body structure disclosed in patent literature 1, the mechanical strength of the rear vehicle body section is to be even further increased, it is conceivable to define another closed sectional shape similar to the above-mentioned second closed sectional shape by additionally providing a reinforcing member, such as for the damper stiffener, between the rear wheel arch and the rear pillar. However, such an approach would lead to an increased weight of the vehicle. Particularly, if the thickness of the vehicle body is increased to increase the mechanical strength of the vehicle body during travel of the vehicle, the vehicle would significantly increase in weight. Further, depending on the design of the vehicle, the increased thickness of the vehicle body would lower a degree of freedom of the reinforcing member but also reduce the capacity of a baggage chamber of the vehicle.

Prior Art Literature: Japanese Utility Model Application Laid-Open Publication No. HEI-3-44079.

SUMMARY OF INVENTION

Technical Problem

It is therefore an object to provide an improved rear vehicle body structure which can increase the strength of the vehicle body and secure a sufficient capacity of the baggage chamber of the vehicle while achieving a reduced weight of the vehicle body.

Solution to Problem

According to claim 1 of the instant application, there is provided a rear vehicle body structure, which comprises: a rear pillar of a rear vehicle body section of a vehicle; a rear wheel arch disposed underneath the rear pillar; a damper stiffener extending in such a manner that loads transmitted to the rear wheel arch and transmitted from the rear wheel arch to a damper are dispersed to the rear pillar; and a brace extending in a rearward direction of the vehicle continuously from the damper stiffener and extending from the rear wheel arch to the rear pillar, the brace having a front surface section located in a front portion of the brace to face in a forward direction of the vehicle, a side surface section extending rearwardly continuously from the front surface section, and a rear surface section extending continuously from the side surface section to be located in a rear portion of the brace, the rear surface section being opposed to the front surface section, at least one of a front ridgeline portion defined by the front surface section and the side surface section and a rear ridgeline portion defined by the side surface section and the rear surface section extending from the rear wheel arch to reach the rear pillar.

Preferably, as recited in claim 2, the front surface section, the side surface section and the rear surface section of the brace protrude from the rear pillar in a lateral outward direction of the vehicle, and the brace further includes a ceiling section extending from respective upper end portions of the front surface section, the side surface section and the rear surface section to reach the rear pillar.

Preferably, as recited in claim 3, the front ridgeline portion reaches the rear pillar by being extended via the front surface section and the ceiling section, and the rear ridgeline portion reaches the rear pillar by being extended via the rear surface section and the ceiling section.

Preferably, as recited in claim 4, the brace has a convex- or concave-shaped horizontal bead section provided on a lower portion of the front surface section or on a lower portion of the rear surface section.

Preferably, as recited in claim 5, the rear wheel arch has a joining arch flange projecting in a radially-outward direction of the vehicle, the brace has at least one of a front flange bent from a front end of the front surface section to extend in the forward direction of the vehicle and a rear flange bent from a rear end of the rear surface section to extend in the rearward direction of the vehicle, a brace joining portion of at least one of the front flange and the rear flange is joined to the joining arch flange in superposed relation to the joining arch flange, and the lower portion having the horizontal bead section provided thereon is a portion which is superposed on the joining arch flange and on which the brace joining portion is formed.

Preferably, as recited in claim 6, the horizontal bead section extends from a brace joining portion of the front flange or from a brace joining portion of the rear flange.

Preferably, as recited in claim 7, the rear wheel arch includes an inner rear wheel house and an outer rear wheel house, the joining arch flange comprises a first joining flange of the inner rear wheel house and a second joining flange of the outer rear wheel house joined together in superposed relation to each other, the inner rear wheel house includes a damper base formed on a top portion thereof for fastening thereto the damper, a third joining flange of the damper base is superposed on the brace joining portion with the joining arch flange sandwiched therebetween, a total of four flanges, which are the joining arch flange, the first joining flange, the second joining flange and the third joining flange, are joined together at a spot welding portion, and the brace joining portion is partly recessed to form a recessed portion.

Advantageous Effects of Invention

With the invention recited in claim 1, even where the brace is formed of a thin steel plate, it is possible to secure a sufficient mechanical strength of the brace against a load input from the damper to the brace via the rear wheel arch by virtue of a particular sectional shape of the brace, defined by the front surface section, side surface section and rear surface section, and at least one of the ridgelines. Thus, the present invention can increase the mechanical strength of the vehicle body but also reduce the weight of the vehicle body.

With the invention recited in claim 2, where the brace has the ceiling section, the brace can have an increased mechanical strength by the ceiling section joining together the respective upper end portions of the front surface section, side surface section and rear surface section.

With the invention recited in claim 3, the ceiling section can have an increased mechanical strength by the provision of the front ridgeline portion (upper front ridgeline portion) and rear ridgeline portion (upper rear ridgeline portion) formed on the ceiling section. As a result, the present invention can secure a sufficient capacity of the baggage chamber while increasing the mechanical strength of the rear wheel arch and damper house section.

With the invention recited in claim 4, where the brace has the convex- or concave-shaped horizontal bead section provided on the lower portion of the front surface section or on the lower portion of the rear surface section, a load input in a vehicle width direction is dispersed by the horizontal bead section. As a result, the present invention can increase the mechanical strength of the brace so that an increased mechanical strength can be achieved against twisting force of the vehicle body.

With the invention recited in claim 5, a load from the damper, which would concentrate on an intersecting portion of the front or rear ridgeline intersecting with the horizontal bead section, can be dispersed from the horizontal bead section directly to the brace joining portion and then dispersed from the brace joining portion to the joining arch flange. As a result, the present invention can achieve an increased mechanical strength against twisting force of the vehicle body by the provision of the horizontal bead section while increasing the mechanical strength of the rear wheel arch by the provision of the front and rear ridgeline portion.

With the invention recited in claim 6, where the horizontal bead section extends from the brace joining portion of the front flange or from the brace joining portion of the rear flange, the present invention can achieve an even further increased mechanical strength against twisting force of the vehicle body.

With the invention recited in claim 7, where the recessed portion is formed by partly recessing the brace joining portion, a three-flange-superposed section is formed, because of which it is possible to eliminate a section where the four flanges are superposed on one another and welded together at a single spot-welding portion (including a nugget). As a result, the present invention can secure a sufficient strength at the spot-welding portion.

DESCRIPTION OF EMBODIMENTS

Preferred embodiments of the present invention will now be described in detail with reference to the accompanying drawings.

Figure 1:
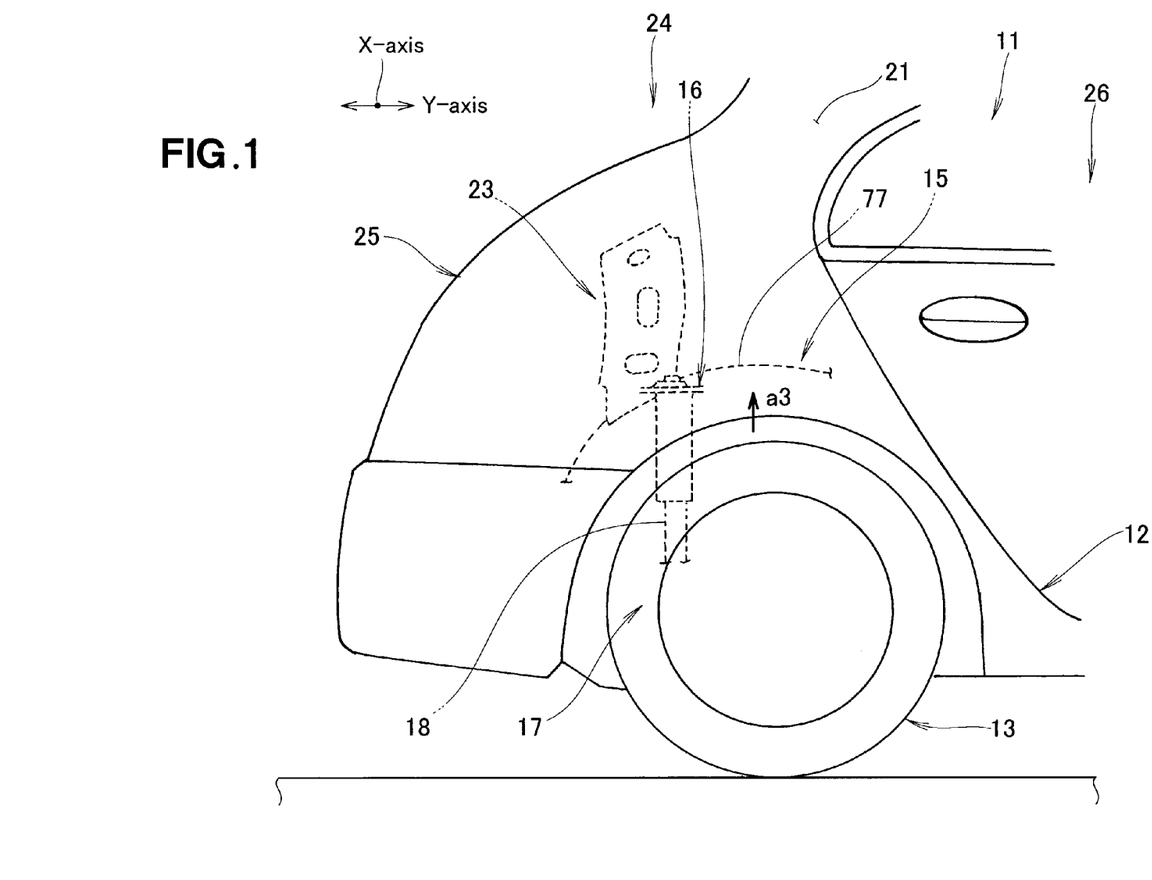
FIG. 1 is a side view showing a rear section of a vehicle employing an embodiment of a rear vehicle body structure of the present invention.
Figure 2:
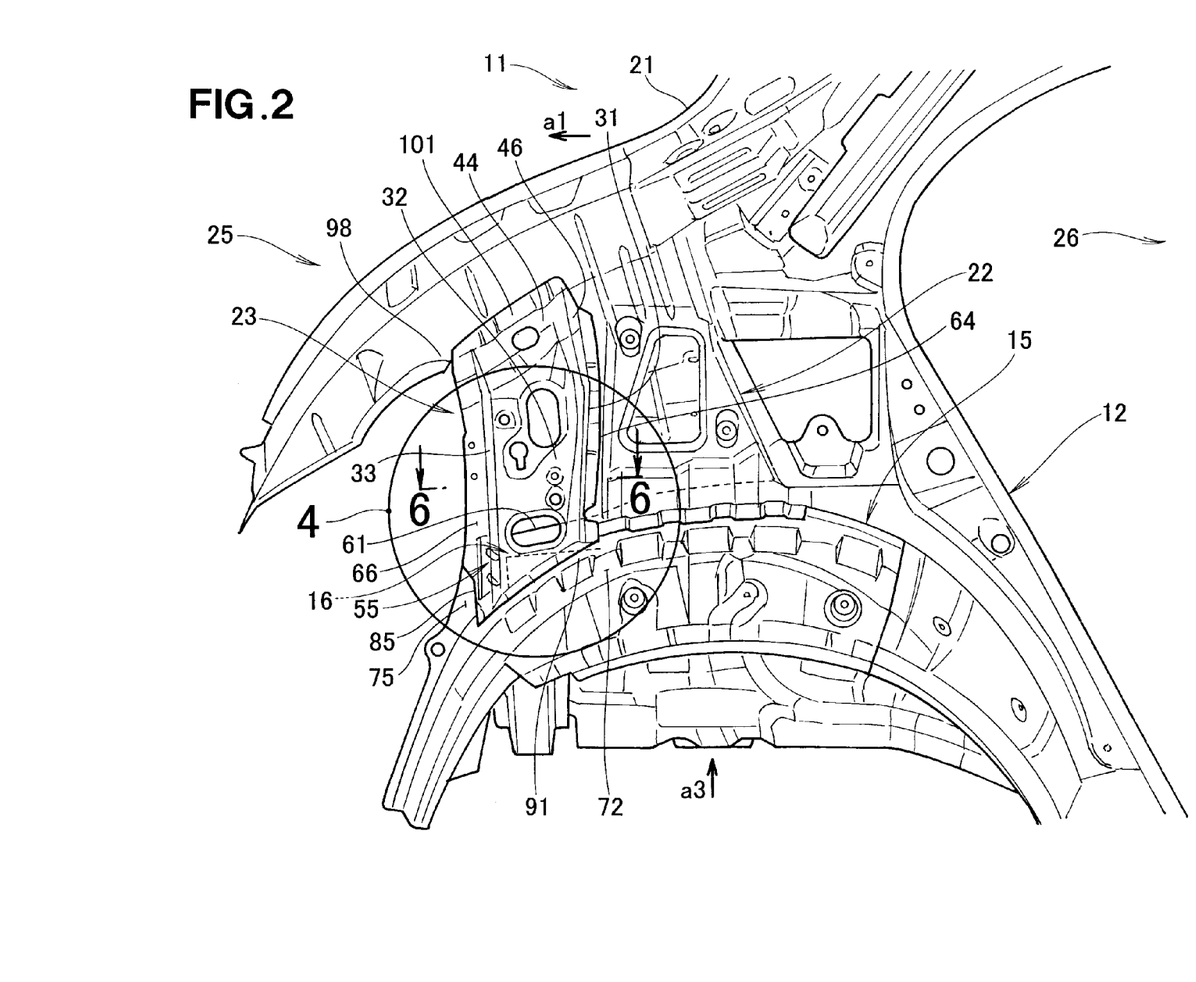
FIG. 2 is a side view of the rear vehicle body structure shown in FIG. 1.

As shown in FIGS. 1 and 2, a rear vehicle body structure according to an embodiment of the present invention is employed in a rear section of a body 12 of a vehicle 11, in which a damper 18 of a rear suspension 17 is mounted in a damper house section 16 that is provided in a rear wheel arch 15 of the vehicle body 12 covering an upper portion of a rear wheel 13.

Figure 3:
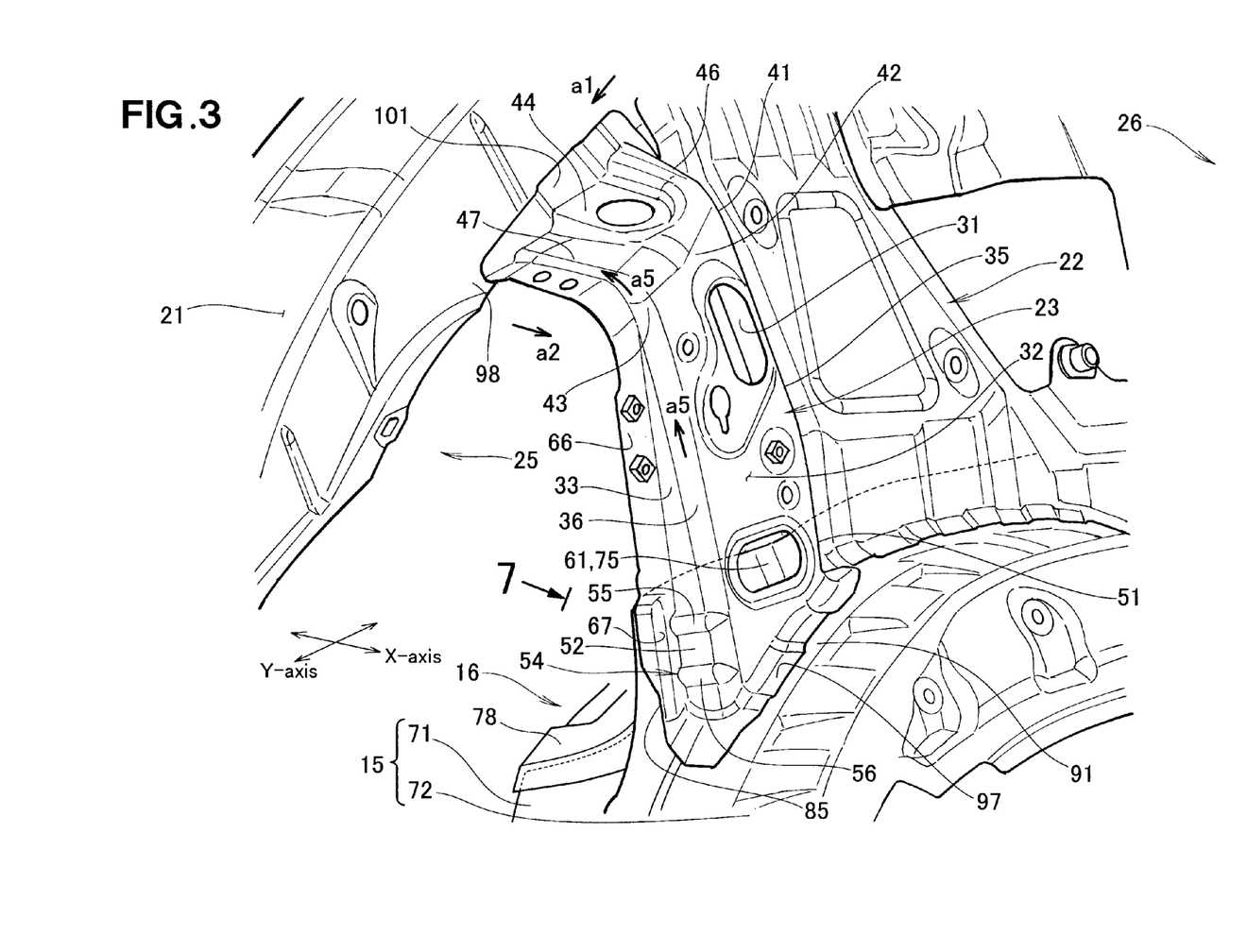
FIG. 3 is a perspective view showing a brace and other components around the brace shown in FIG. 2.
Figure 4:
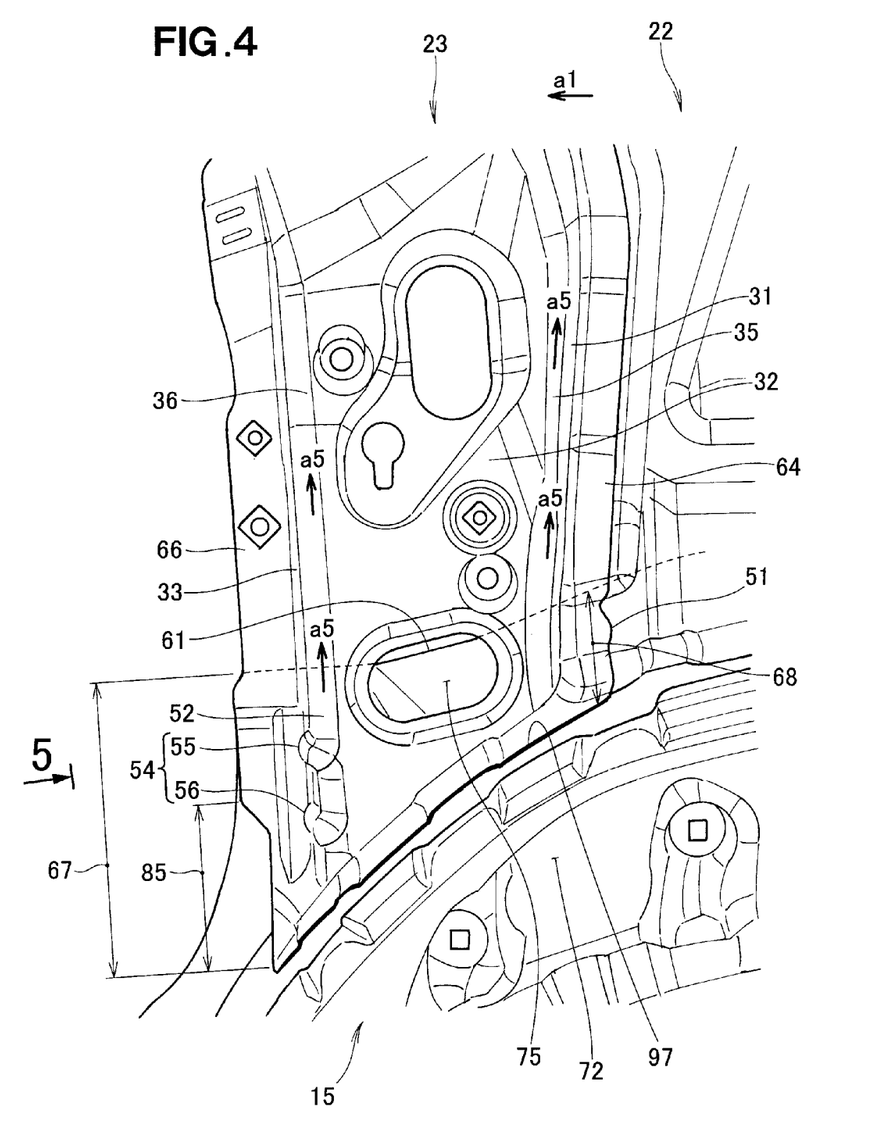
FIG. 4 is a detailed view of a section encircled at "4" in FIG. 2.

Further, as shown in FIGS. 2 and 3, a damper stiffener 22 and a brace 23 of the vehicle 12 are provided between the rear wheel arch 15 and a rear pillar 21 of the vehicle body 12 disposed above the rear wheel arch 15. The damper stiffener 22 and the brace 23 are also connected to the damper house section 16 (see FIG. 7). A baggage chamber 25 is defined in a rear vehicle body section 24 (FIG. 1) of the vehicle 11. Further, reference numeral 26 represents a passenger compartment. In FIG. 3, an X-axis direction represents a width direction of the vehicle, while a Y-axis direction represents a front-rear direction of the vehicle.

The following describe, with reference to FIGS. 1 to 9, principal structural arrangements of the embodiment of the rear vehicle body structure. As shown in FIG. 1, the rear vehicle body structure includes: the rear pillar 21 provided in the rear vehicle body section 24 of the vehicle 11; the rear wheel arch 15 disposed underneath the rear pillar 21; and the damper stiffener 22 (FIG. 3) extending in such a manner that a load applied from the rear wheel arch 15 to the damper 18 can be dispersed to the rear pillar 21.

As shown in FIG. 2, the rear vehicle body structure further includes the brace 23 extending continuously from the damper stiffener 22 in a rearward direction of the vehicle 11 (i.e., in a direction of arrow of a1 in FIGS. 2 to 4) and extending from the rear wheel arch 15 to the rear pillar 21.

Figure 6:
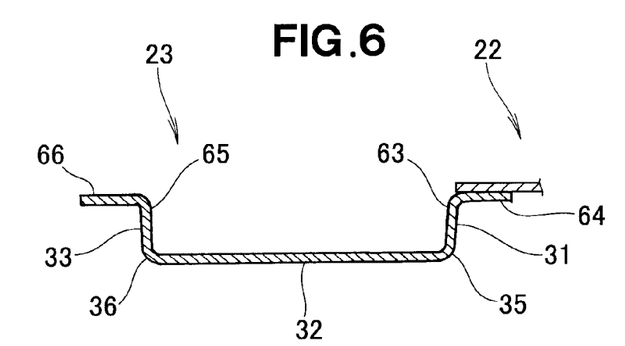
FIG. 6 is a sectional view taken along line 6-6 of FIG. 2.
Figure 7:
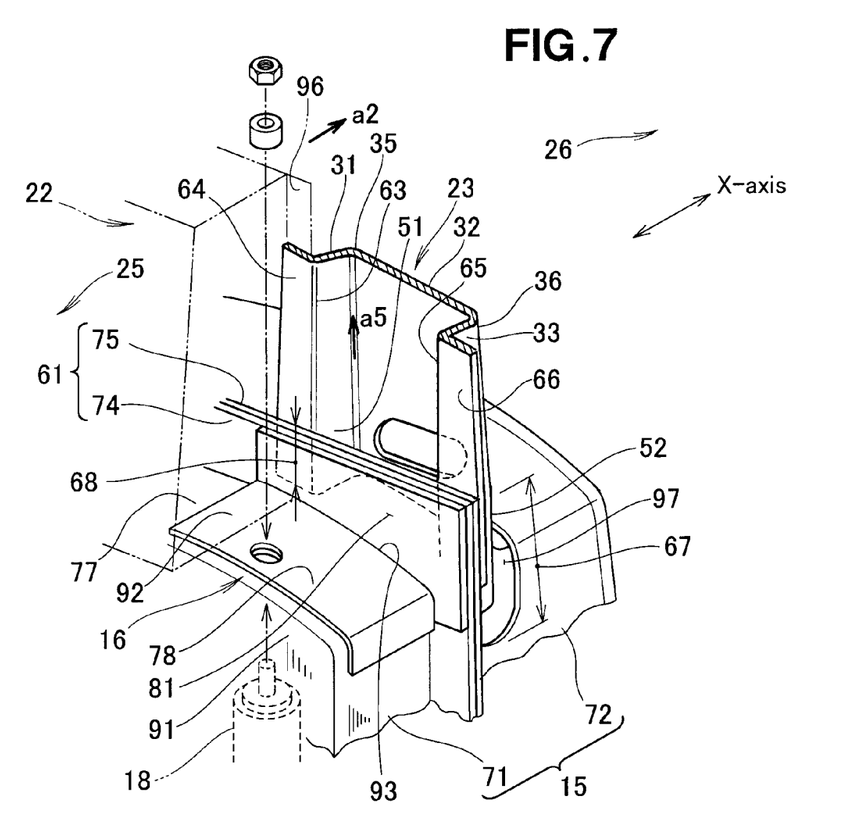
FIG. 7 is a view as seen in the direction of arrow 7 of FIG. 3.

As shown in FIGS. 2, 6 and 7, the brace 23 has a front surface section 31 facing in the forward direction of the vehicle 11, a side surface section 32 extending in the rearward direction of the vehicle continuously from the front surface section 31, and a rear surface section 33 extending continuously from the side surface section 32 to face in the rearward direction of the vehicle 11 and opposed to the front surface section 31. At least one of a front ridgeline portion 35 defined by the front surface section 31 and the side surface section 32 and a rear ridgeline portion 36 defined by the side surface section 32 and the rear surface section 33 extends from the rear wheel arch 15 to reach the rear pillar 21.

Further, in the brace 23, as shown in FIGS. 3 and 7, the front surface section 31, side surface section 32 and rear surface section 33 protrude from the rear pillar 21 in a lateral outward direction of the vehicle 11 (i.e., in a direction of arrow a2). The brace 23 further includes a ceiling section 44 extending from the respective upper end portions 41, 42 and 43 of the front surface section 31, side surface section 32 and rear surface section 33 to the rear pillar 21 and joined to the rear pillar 21.

The front ridgeline portion 35 reaches the rear pillar 21 by being extended via the front surface section 31 and ceiling section 44.

More specifically, an upper front ridgeline portion 46 included in the front ridgeline portion 35 is defined by the front surface section 31 and ceiling section 44 and reaches the rear pillar 21. Similarly, an upper rear ridgeline portion 47 included in the rear ridgeline portion 36 is defined by the rear surface section 33 and ceiling section 44 reaches the rear pillar 21.

A convex- or concave-shaped horizontal bead section 54 is provided on a lower portion 51 of the front surface section 31 or on a lower portion 52 of the rear surface section 33 (i.e., lower rear surface portion 52). In the illustrated example, the convex-shaped horizontal bead section 54, comprising upper and lower beads 55 and 56, is provided on the lower portion 52 of the rear surface section 33.

As shown in FIG. 2, the rear wheel arch 15 has a joining arch flange 61 projecting in a radially-outward direction of the vehicle (i.e., in a direction of arrow a3).

As shown in FIGS. 6 and 7, the brace 23 has at least one of a front flange 64 bent from one end (front end) 63 of the front surface section 31 to extend in the forward direction of the vehicle 11 and a rear flange 66 bent from one end (rear end) 65 of the rear surface section 33 to extend in the rearward direction of the vehicle 11. A brace joining portion 67 of the at least one of the front flange 64 and the rear flange 66 (rear flange 66 in the illustrated example) is joined to the joining arch flange 61 in superposed relation to the joining arch flange 61.

Figure 5:
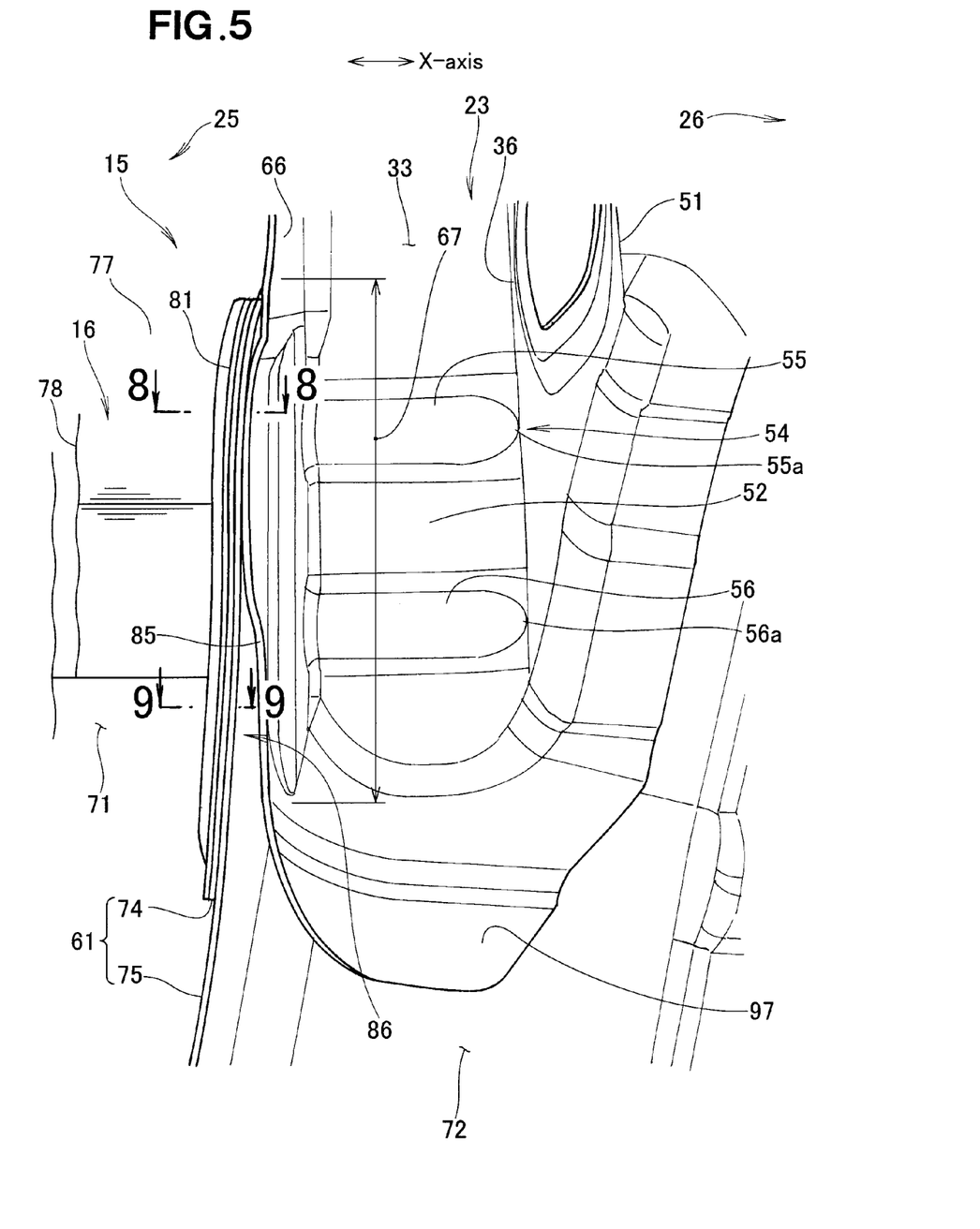
FIG. 5 is a view as seen in the direction of arrow 5 of FIG. 4.

As shown in FIG. 5, the lower portion (lower rear surface portion 52) having the horizontal bead section 54 provided thereon is a portion which is superposed on the joining arch flange 61 and on which the brace joining portion 67 (FIG. 3) is formed. The upper bead 55 of the horizontal bead section 54 intersects with the rear ridgeline portion 36 at an intersecting portion 55a, while the lower bead 56 of the horizontal bead section 54 intersects with the rear ridgeline portion 36 at an intersecting portion 56a.

The horizontal bead section 54 extends from a brace joining portion 68 of the front flange 64 or from the brace joining portion 67 of the rear flange 66; in the illustrated example, the horizontal bead section 54 extends from the brace joining portion 67 of the rear flange 66.

As shown in FIGS. 3 and 7, the rear wheel arch 15 includes an inner rear wheel house 71 and an outer rear wheel house 72. The joining arch flange 61 comprises a joining flange 74 of the inner rear wheel house 71 (first joining flange 74) and a joining flange 75 of the outer rear wheel house 72 (second joining flange 75) joined together in superposed relation to each other.

The inner rear wheel house 71 includes a damper base 78 formed on its top portion for fastening thereto the damper 18. The damper base 78 is included in the damper house section 16.

Figure 8:
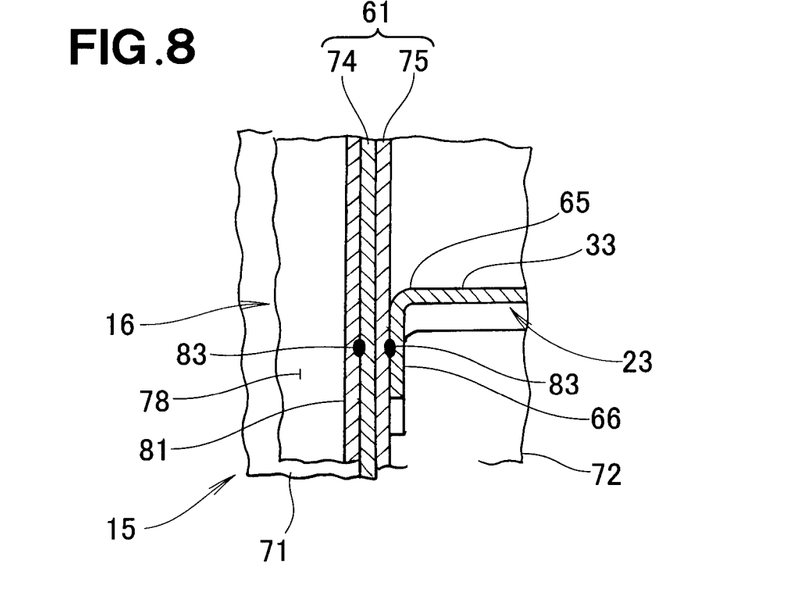
FIG. 8 is a sectional view taken along line 8-8 of FIG. 5.
Figure 9:
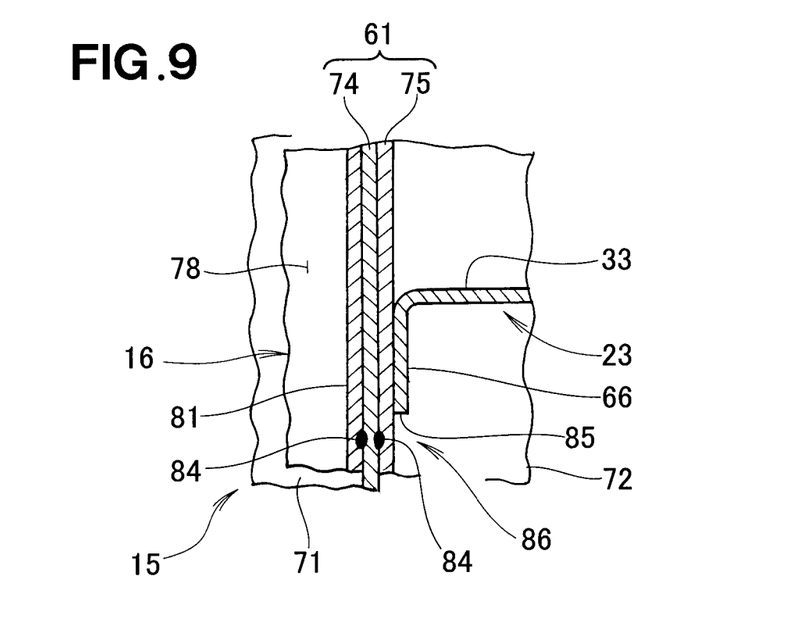
FIG. 9 is a sectional view taken along line 9-9 of FIG. 5.

In the embodiment of the rear vehicle body structure of the present invention, a joining flange 81 of the damper base 78 (third joining flange 81) is superposed on the brace joining portion 67 with the joining arch flange 61 sandwiched therebetween. Also, as shown in FIGS. 8 and 9, a total of four flanges, i.e. rear flange 66 of the brace 23, first joining flange 74, second joining flange 75 and third joining flange 81, are joined together at spot welding portions (including nuggets) 83 and 84, and the brace joining portion 67 is partly recessed to form a recessed portion 85 so that a three-flange-superposed section 86 having only three of the four flanges superposed on one another is formed.

The following describe the embodiment of the rear vehicle body structure of the present invention in greater detail.

In the embodiment of the rear vehicle body structure, as shown in FIG. 7, the damper stiffener 22 is connected to a front end portion 92 of the damper house section 16 (damper base 78) provided on a rear portion 91 of the rear wheel arch 15, and the brace 23 is joined to the outer end 93 of the damper house section 16 via the third joining flange 81.

Further, in the brace 23, the front flange 64 is joined to a rear joining margin 96 of the damper stiffener 22 in superposed relation to the rear joining margin 96, and a lower flange 97 is joined to the outer rear wheel house 72 of the rear wheel arch 15 in superposed relation to the outer rear wheel house 72. Furthermore, an upper flange 101 formed by bending the ceiling section 44 is joined to a lower joining margin 98 (FIG. 3) of the rear pillar 21 in superposed relation to the lower joining margin 98.

As shown in FIG. 5, the horizontal bead section 54 (upper bead 55 and lower bead 56) intersects with the third joining flange 81 of the damper base 78 of the damper house section 16.

With the horizontal bead section 54 comprising the upper bead 55 and the lower bead 56 provided near and parallel to the upper bead 55, the embodiment of the rear vehicle body structure can have an increased mechanical strength against a load applied in the width direction (X-axis direction) of the vehicle 11. As a result, it is possible to increase the mechanical strength of the rear wheel arch 15 and damper house section 16.

The following describe behavior of the embodiment of the rear vehicle body structure of the present invention.

Because the brace 23 has the front ridgeline 35 and rear ridgeline 36 extending in the upward direction of the vehicle 11, a desired mechanical strength can be obtained even where it is formed of a thin steel plate.

Namely, in the embodiment of the rear vehicle body structure, as shown in FIG. 7, a load input via the damper 18 of the rear suspension 17 to the damper house section 16 (damper base 78) in the upward direction of the vehicle 11 is transmitted to the damper stiffener 22 and brace 23.

The load transmitted to the brace 23 is transmitted and dispersed as indicated by arrow a5 (FIG. 4) via the front ridgeline 35 and rear ridgeline 36 extending in the upward direction of the vehicle 11, and thus, the rear vehicle body structure can have a sufficient mechanical strength against input of a thrusting-up load from the damper 18. As a result, the embodiment of the rear vehicle body structure of the present invention can minimize an increase of the weight of the vehicle body while increasing the mechanical strength of the vehicle body.

Because the damper stiffener 22 is disposed substantially immediately over the inner rear wheel house 71 of the rear wheel 15 but the brace 23 is not disposed over the damper house section 16 (damper base 78) provided on the rear portion 91 (FIG. 7) of the inner rear wheel house 71, the embodiment of the rear vehicle body structure of the present invention can advantageously achieve an increased capacity of the baggage compartment 25. The rear portion 91 of the rear wheel arch 15 is the rear portion 91 of the inner rear wheel house 71 and outer rear wheel house 72.

Further, the brace 23 is provided to extend upward from the outer rear wheel house 72 and joined to the outer end 93 of the damper house section 16 (damper base 78) provided on the rear portion 91 of the inner rear wheel house 71, to thereby form the ceiling section 44 (FIG. 3). Thus, a space is defined between the damper house section 16 (damper base 78) and the rear pillar 21 disposed above the damper house section 16 (damper base 78), with the result that the embodiment of the rear vehicle body structure of the present invention can advantageously achieve an even further increased capacity of the baggage compartment 25.

INDUSTRIAL APPLICABILITY

The rear vehicle body structure of the present invention is well suited to application to automobiles.

LEGEND

11 . . . vehicle, 15 . . . rear wheel arch, 16 . . . damper house section, 18 . . . damper, 21 . . . rear pillar, 22 . . . damper stiffener, 23 . . . brace, 24 . . . rear vehicle body section, 31 . . . front surface section, 32 . . . side surface section, 33 . . . rear surface section, 35 . . . front ridgeline portion, 36 . . . rear ridgeline portion, 41 . . . upper end portion of the front surface section, 42 . . . upper end portion of the side surface section, 43 . . . upper end portion of the rear surface section, 44 . . . ceiling section, 51 . . . lower front surface portion, 52 . . . lower rear surface portion, 54 . . . horizontal bead section, 61 . . . joining arch flange, 64 . . . front flange, 66 . . . rear flange, 67 . . . brace joining portion, 71 . . . inner rear wheel house, 72 . . . outer rear wheel house, 74 . . . first joining flange of the inner rear wheel house, 75 . . . second joining flange of the outer inner rear wheel house, 77 . . . top section, 78 . . . damper base, 83 . . . welding portion, 84 . . . welding portion, 85 . . . recessed portion

The invention claimed is:

1. A rear vehicle body structure comprising:
   a rear pillar of a rear vehicle body section of a vehicle;
   a rear wheel arch disposed underneath the rear pillar;
   a damper stiffener extending vertically between the rear wheel arch and the rear pillar in such a manner that loads transmitted to the rear wheel arch and transmitted from the rear wheel arch to a damper are dispersed to the rear pillar; and
   a brace extending in a rearward direction of the vehicle continuously from the damper stiffener and extending vertically upward from the rear wheel arch to the rear pillar,
   wherein the rear wheel arch has a joining arch flange projecting in a radially-outward direction of the vehicle,
   wherein the brace has a front surface section located in a front portion of the brace to face in a forward direction of the vehicle, a side surface section extending rearwardly continuously from the front surface section, a rear surface section extending continuously from the side surface section to be located in a rear portion of the brace, the rear surface section being opposed to the front surface section, and a convex or concave-shaped horizontal bead section provided on a lower portion of the front surface section or on a lower portion of the rear surface section,
   wherein the brace has at least one of a front flange bent from a front end of the front surface section to extend in the forward direction of the vehicle and a rear flange bent from a rear end of the rear surface section to extend in the rearward direction of the vehicle,
   wherein at least one of the front flange and the rear flange has a brace joining portion joined to the joining arch flange in superposed relation to the joining arch flange,
   wherein the lower portion of the brace having the horizontal bead section provided thereon is a portion which is superposed on the joining arch flange and on which the brace joining portion is formed, and
   wherein at least one of a front ridgeline portion defined by the front surface section and the side surface section and a rear ridgeline portion defined by the side surface section and the rear surface section extends from the rear wheel arch to reach the rear pillar.

2. The rear vehicle body structure according to claim 1, wherein the front surface section, the side surface section and the rear surface section of the brace protrude from the rear pillar in a lateral outward direction of the vehicle, and wherein the brace further includes a ceiling section extending from respective upper end portions of the front surface section, the side surface section and the rear surface section to reach the rear pillar.

3. The rear vehicle body structure according to claim 2, wherein the front ridgeline portion reaches the rear pillar by being extended via the front surface section and the ceiling section, and
   the rear ridgeline portion by being extended via the rear surface section and the ceiling section.

4. The rear vehicle body structure according to claim 1, wherein the horizontal bead section extends from a brace joining portion of the front flange or from the brace joining portion of the rear flange.

5. The rear vehicle body structure according claim 1, wherein the rear wheel arch includes an inner rear wheel house and an outer rear wheel house,
   the inner rear wheel house has a first joining flange and the outer rear wheel house has a second joining flange joined together in superposed relation to each other to jointly form the joining arch flange,
   the inner rear wheel house includes a damper base formed on a top portion thereof for fastening thereto the damper,
   the damper base has a third joining flange superposed on the brace joining portion with the joining arch flange sandwiched therebetween, a total of four flanges, which are the joining arch flange, the first joining flange, the second joining flange and the third joining flange, are joined together at a spot welding portion, and
   the brace joining portion is partly recessed to form a recessed portion.

6. The rear vehicle body structure according to claim 1, wherein the horizontal bead section comprises an upper bead and a lower bead provided on the lower portion of the front surface section or on the lower portion of the rear surface section, the upper and lower beads being located close to each other and extending parallel to each other.

7. The rear vehicle body structure according to claim 6, wherein the upper and lower beads are convex-shaped and provided on the lower portion of the rear surface section.

\* \* \* \* \*